Patented July 25, 1933

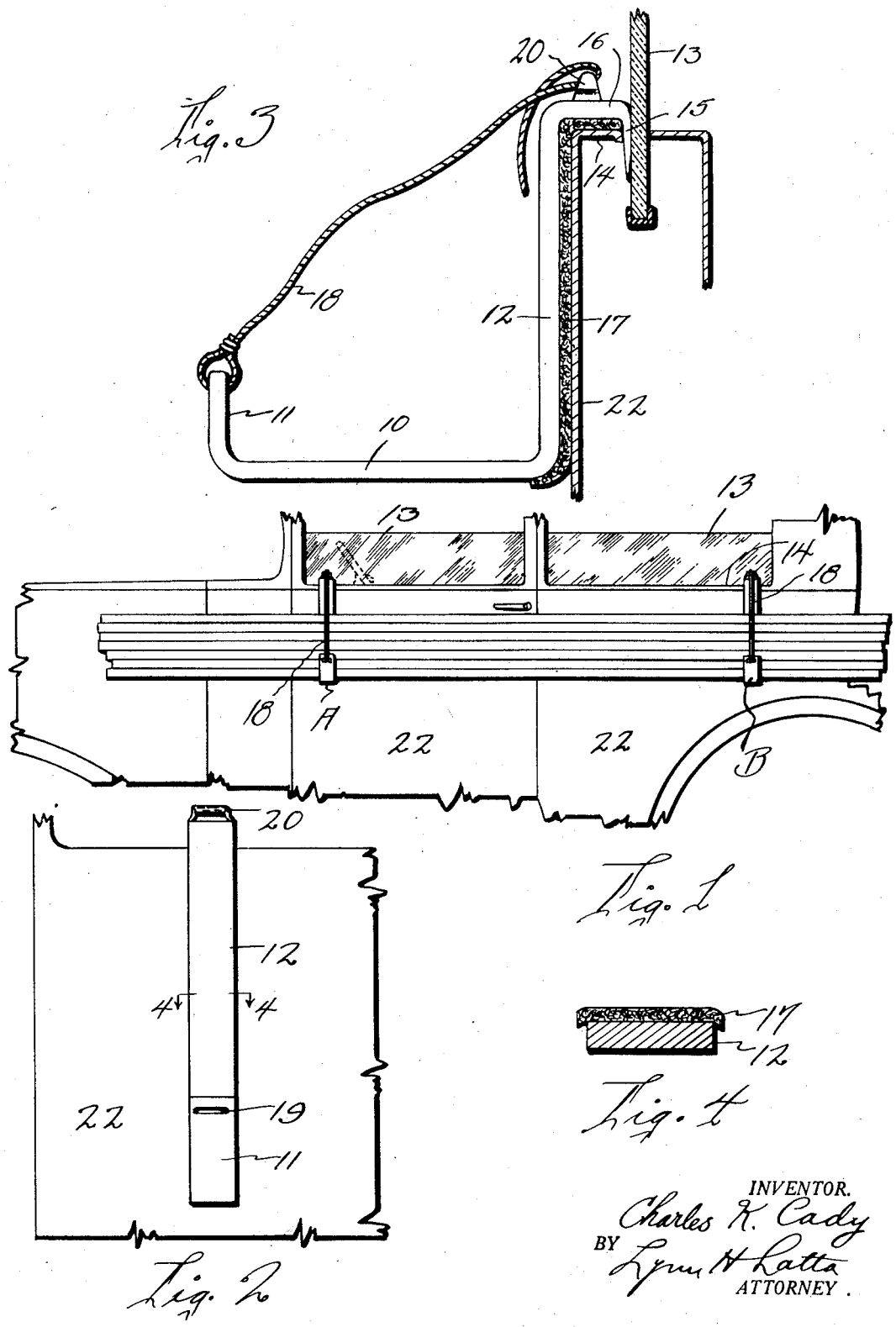

1,919,271

UNITED STATES PATENT OFFICE

CHARLES K. CADY, OF SIOUX CITY, IOWA

LUMBER RACK

Application filed September 27, 1930. Serial No. 484,780.

My invention relates to a device for carrying lumber and has for its object to provide a device which may be attached to a passenger vehicle so that lumber may be carried by the vehicle without injuring the finish thereof in any way. Another object is to provide a device capable of carrying lumber of a length equal to or greater than that of the vehicle in a position where it will interfere very little with the handling of the vehicle.

A further object is to provide a lumber carrying attachment for a vehicle which is of very simple, durable, and inexpensive construction.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Fig. 1 is a side elevation of a portion of vehicle, my invention attached thereto and handling a load of lumber.

Fig. 2 is an enlarged side elevation of the device.

Fig. 3 is a detailed sectional view through a portion of the vehicle, the device of my invention being shown in elevation, and Fig. 4 is a detailed sectional view taken on the line 4—4 of Fig. 2.

There is a very distinct need for a simple device which can be attached to a vehicle without marring the same so as to provide means for carrying a small load of lumber on a passenger vehicle. A large amount of lumber is sold in individually small quantities to owners of passenger vehicles who attempt to carry the lumber on said vehicles by wiring or roping it to the side of the vehicle in some manner. This is inconvenient and very detrimental to the finish of vehicle.

The primary object of the present invention is of course to provide means of carrying lumber which will not injure the finish of the vehicle. However, a number of problems are encountered in attempting to provide such an instrument, the primary problem being that of obtaining sufficient strength.

Another problem resides in the requirement that the device be simple and inexpensive. Another problem is that of providing a simple means for attachment of the carrying device to the vehicle.

A still further problem is that of attaching the device in such a position that the lumber may be carried parallel to the side of the vehicle and as close thereto as possible.

In order to obtain simplicity, the carrier takes the form of a pair of hooks, "A" and "B", each of which has the horizontal supporting member 10, and the two side arms 11 and 12 respectively, forming together with the supporting member 10 a substantially U shaped hook of sufficient width to receive lumber up to widths of twelve inches.

The problem of finding a suitable mode of attachment to the vehicle has proved the most difficult. Hanging from the metal hardware of the vehicle, which is not easily injured, was considered but found to be impractical because such methods of attachment afforded inadequate security of support.

Hanging over the edges of the door and window of the vehicle was for a long time considered impractical because of the inability of the operator of the vehicle to raise the windows when the device would be in place.

Ultimately the possibility of providing the lumber supporting hooks with relatively thin lips to be inserted between the glass 13 and the outer sill 14 of the window casing was hit upon. This at first was considered impractical because of the danger of breakage of the glass however, I discovered that by forming the lip 15 which extends between the claims and the window casing of sufficient thickness so that it fills the space between the glass and the casing, that the device could be used without danger of breakage of the glass.

I attribute this fact to the holding of the glass so that it cannot impact against the metal lip 15.

By making the lip thick enough to fill the entire space between the glass and the frame, I also obtain the advantage of maximum strength in the lip itself.

The shoulder portion 16 which connects the lip 15 with the arm 12 is supported upon the casing 14 and thereby supports the weight of the device plus its load of lumber.

The finish of the vehicle is protected by a strip of felt 17 which is cemented to the faces of the arm 12 and shoulder 16 respectively. The felt terminates against the face of the lip 15.

The lip 15 is made wedge shaped as shown so as to make it easier to insert it into the space between the glass and the window casing. Furthermore, this wedge shape aids in the snug fitting of the lip between the glass and the casing 14. A further advantage of the wedge shape resides in the reduction of the area of contact with the glass, thereby making it possible to raise the glass while the device is in place, should it be desired to do so.

There is not a great deal of friction between the smooth faces of the glass and the metal lip 15 and the glass can therefore be raised in spite of the snug fit of the lip 15 between the glass and the casing 14.

The outer arm 11 is short, thereby making it easier for the operator to load lumber into the hook. The lumber is held in place by a strap or cord or flexible element 18 which is secured to the arm 11 through an aperture 19 and which may be tied to a yoke 20 formed on the shoulder 16. The construction of the yoke is thought to be obvious from the drawing.

The device is formed of a single length of heavy strap iron and forced to the proper shape.

While the strip of material 17 is preferably of felt, any suitable material such as the smoother fabrics, or even leather or rubber might be employed for this purpose.

A portion of the weight of the lumber is carried by the side wall 22 of the window casing, against which rests the inner arm 12 of the lumber supporting hook.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A lumber supporting hook for attachment to a passenger vehicle formed of a single length of bar metal formed with an intermediate vertical arm the upper end of which is continued horizontally to form a shoulder for resting on the outer sill of the vehicle window, a lip extended downwardly from said shoulder and receivable between the said sill and the glass of the window, a facing of protective material on said arm to engage the outer surface of the vehicle, a horizontal supporting arm extending outwardly from the lower end of said vertical arm, a relatively short arm projecting upwardly from the outer end of said supporting arm, and a flexible element detachably secured between said short arm at its upper end and said shoulder and adapted to rest across the top of a pile of lumber supported in said hook.

2. A lumber supporting hook for attachment to a passenger vehicle formed of a length of bar metal that is generally S-shaped, with a horizontal supporting arm, a relatively short arm extending upwardly from the outer end thereof, a relatively long vertical arm extending upwardly from the inner end thereof, a shoulder on the upper end of said long arm, to rest on a vehicle window sill, a lip extending downwardly from said shoulder, a loop secured to said shoulder and projecting rigidly therefrom, a flexible element secured in the end of said short arm, and adapted to be tied in said loop, and a facing of protective material on the inner side of said long arm, to engage the surface of a vehicle.

CHARLES K. CADY.